United States Patent [19]

Markowski

[11] 4,145,879

[45] Mar. 27, 1979

[54] MODIFIED VORBIX BURNER CONCEPT

[75] Inventor: Stanley J. Markowski, East Hartford, Conn.

[73] Assignee: United Technologies Corp., Hartford, Conn.

[21] Appl. No.: 861,091

[22] Filed: Dec. 15, 1977

[51] Int. Cl.² ............................................. F02K 3/10
[52] U.S. Cl. ........................................ 60/261; 60/262
[58] Field of Search ...................... 60/262, 261, 39.69, 60/39.65, 39.71

[56] References Cited

U.S. PATENT DOCUMENTS

| 3,830,431 | 8/1974 | Schwartz | 60/262 |
| 3,872,664 | 3/1975 | Lohmann et al. | 60/39.65 |
| 3,930,370 | 1/1976 | Markowski et al. | 60/262 |
| 3,973,390 | 8/1976 | Jeroszko | 60/39.65 |
| 4,045,956 | 9/1977 | Markowski et al. | 60/39.65 |

Primary Examiner—Robert E. Garrett
Attorney, Agent, or Firm—Charles A. Warren

[57] ABSTRACT

An augmenter construction for fan engines in which the fan air and engine gas are distributed through transition ducts terminating in vortex generators and the fuel rich pilot gas discharges into diffusers downstream of the vortex generators to mix with the vortices within the diffusers for improved combustion.

9 Claims, 2 Drawing Figures

MODIFIED VORBIX BURNER CONCEPT

BACKGROUND OF THE INVENTION

The use of augmenters with fan engines always presents a problem in obtaining the desired mixing of the fan air and engine gas with the fuel rich pilot gas so as to minimize the length of combustion chamber needed for complete combustion. Adequate mixing has required a relatively long combustion chamber in order that the fuel will be fully utilized prior to the discharge of the propulsive gases through the thrust nozzle.

SUMMARY OF THE INVENTION

The copending application of Markowski, U.S. Ser. No. 861,092, filed Dec. 15, 1977 describes a method for producing vortices in the engine gas and fan air with the fuel rich gas mixing with these vortices downstream of the diffusers positioned to surround the vortices. The present invention is an improvement in that the fuel rich gas is caused to mix with the vortices within the diffuser itself and the diffusers are so constructed as to assure the passage of substantially all of both engine gas and fan air through the vortex generators and also the entry of the fuel-rich gas into the space within the diffuser.

A feature of the invention is a diffuser construction that receives the propulsive gases, both engine gas and fan air, and that has openings therein for the entry of the fuel-rich pilot gas so that mixing occurs within rather than downstream of the diffuser. The result is better mixing further upstream. Another feature is an arrangement of the diffusers to assure that substantially all the engine gas and fan air flows through the vortex generators and also to deliver the fuel-rich gas into the spaces within the diffuser rather than passing around the downstream edges of the diffuser. Another feature is the combustion of fuel upstream of the main augmenter fuel nozzles to assure an adequate gas temperature for vaporizing the main augmenter fuel before it enters the diffusers.

According to the invention the fan air and the engine gas are discharged through tubes having vortex generators therein into diffusers at the ends of these tubes. These diffusers change in shape from circular at the upstream end where they join the tubes to truncated sector shape, or substantially rectangular shape and are constructed so that these downstream ends fill the duct in which they are positioned. The fuel-rich pilot gas flowing around the tubes is thus caused to flow into the diffusers through openings therein near the upstream ends so that this gas is mixed with the propulsive fluids, the engine gas and fan air, entering the diffusers from the tubes.

The foregoing and other objects, features, and advantages of the present invention will become more apparent in the light of the following detailed description of preferred embodiments thereof as illustrated in the accompanying drawing.

DESCRIPTION OF THE PREFERRED EMBODIMENT

Figure 1:
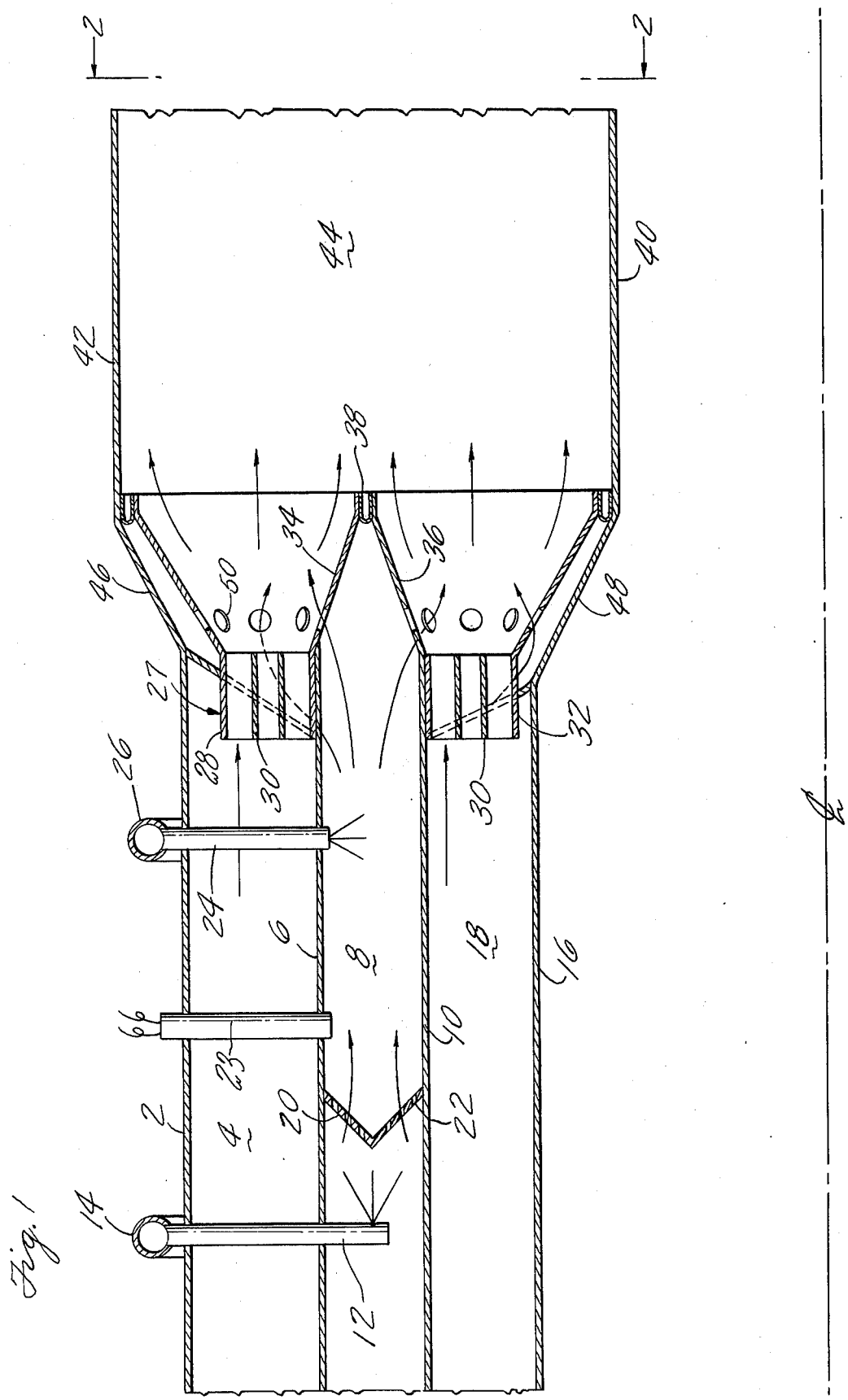
FIG. 1 is a longitudinal sectional view through the augmenter.
Figure 2:
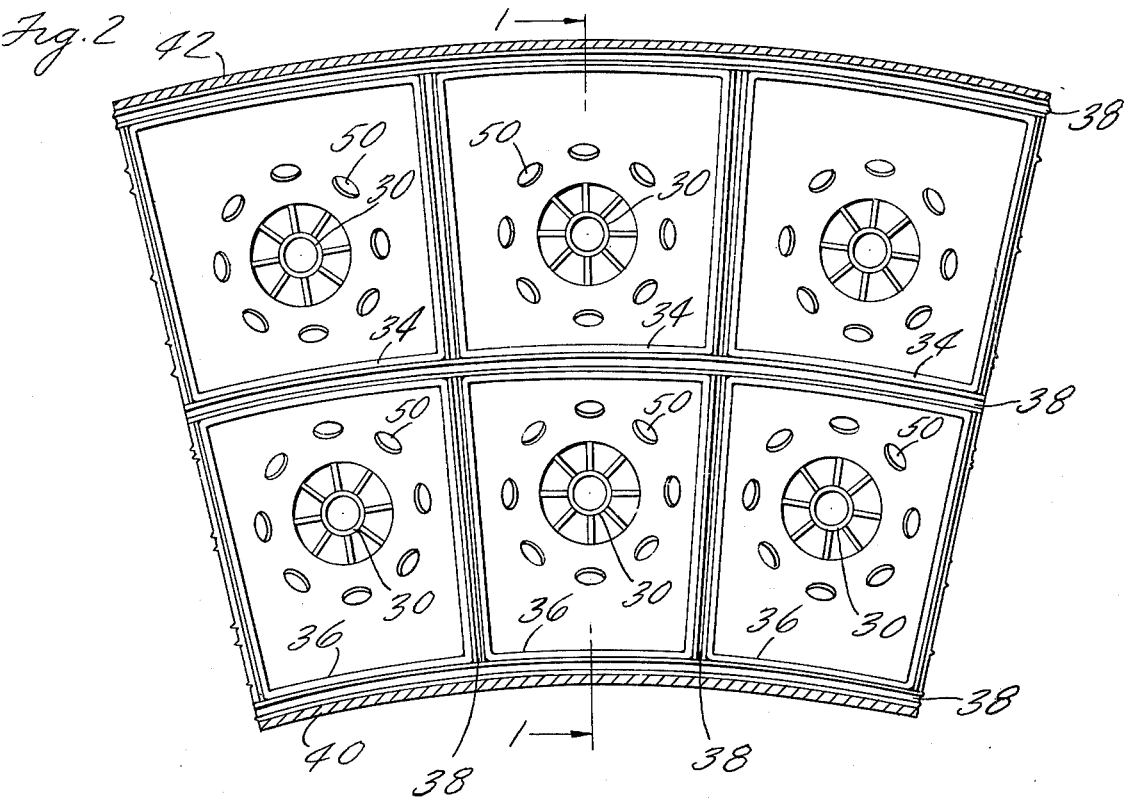
FIG. 2 is a sectional view along line 2—2 of FIG. 1.

Referring to FIG. 1, the drawing represents an outer duct 2 within which is a passage 4 for fan air from a ducted fan gas turbine. The inner wall of this passage is formed by an intermediate duct 6. Radially inward of the duct 2 is an intermediate passage 8, the forward end of which receives engine gas from the gas turbine engine. The inner wall of passage 8 is a shield 10, the upstream end of which terminates just upstream of a row of pilot fuel nozzles 12 positioned in the duct 6. These nozzles 12 are supplied from a manifold 14.

An inner duct 16 defines, between it and shield 10, a passage 18 for engine gas. It will be understood that this engine gas is also in passage 8 as both this passage and passage 18 form a common passage upstream of the shield 10. The inner duct 16 is generally the tail cone of the engine.

The passage 8 has, downstream of the nozzles 12, a flameholder 20 that preferably fills the passage and has a large number of holes 22 therethrough for the flow of the gas mixed with pilot fuel therethrough. Ignition of this fuel may be by autoignition from the heat in the engine gas but it is usually preferable to have an igniter 23 located just downstream of the flameholder and mounted in the duct 6. The configuration creates adequate turbulence to assure good mixing of the pilot fuel and engine gas for complete combustion. Further downstream in a row of main augmenter fuel nozzles 24 also discharging into the passage 8 and creating a fuel rich pilot gas in this passage. The nozzles 24 are supplied from a fuel manifold 26.

In some augmenters, the engine gas entering the duct 8 may already be hot enough to assure complete vaporization of the fuel from the main nozzles before the mixture of fuel with the gas reaches the combustion area. The pilot fuel combustion downstream of the flameholder is used to provide a higher temperature gas in which the main fuel will mix and vaporize more quickly. It is desirable that the mixture of the main augmenter fuel and engine gas be so well mixed and at such a temperature as to be autoignitable downstream of the fuel nozzles when the mixture reaches the combustion area as will be described.

A plurality of vortex generators 27 are positioned in the fan air passage at the downstream end of the duct 6. These generators are circumferentially spaced within this duct passage and are preferably secured to the duct 6. Each vortex generator has an outer ring or shroud 28, an inner shroud or tube 30, and a row of turning vanes extending between these shrouds. The tube 30 is unobstructed to permit a central core of air without a swirl to enter the vortex established by the vanes in the vortex generator.

A similar row of vortex generators 32 are positioned in the engine gas passage 18 in substantially the same general transverse plane as the generators in the fan or passage 4. These generators are similar in construction and similarly circumferentially spaced from one another. Neither row of generators fills the passage in which they are located so that there is a flow of gas air from the associated passage around these vortex generators. The generators 32 are preferably secured to and located at the downstream end of shield 10.

Extending downstream from each of the vortex generators are diffusers 34 and 36 on the generators 27 and 32, respectively. These diffusers change in shape from circular at their upstream ends where they are attached to the outer shrouds of the vortex generators, to truncated sector shape or substantially rectangular at their downstream ends. All the diffusers terminate substantially in the same transverse plane and suitable seals 38 are positioned between the trailing edges of adjacent diffusers to close the spaces therebetween and between the diffusers and the inner and outer ducts 40 and 42 defining the annular combustion chamber 44 located downstream of the diffusers and into which gas from the diffusers is discharged. These ducts are in effect extensions of the outer fan duct 2 and the inner duct or tail cone 16. Duct 2 and duct 42 are connected by a ring 46, and this ring extends inwardly to the intermediate duct 6 so that the vortex generators 27 extend therethrough. In this way, all of the air in passage 4 is directed through the vortex generators. Ducts 16 and 40 are connected by a similar ring 48, both these rings making an acute angle with the axis of the augmenter and diverging from one another in a downstream direction. This ring 48 extends past the duct 16 to the shield 10 so that all the engine gas in passage 18 will be directed through vortex generators 32.

Each of the diffusers has a row of large holes 50 adjacent the upstream ends near the discharge from the vortex generators, and the fuel-rich gas from passage 8 that flows around the spaces between the diffusers and the rings 46 and 48 enters the diffusers through these holes. Thus intimate mixing of all the gases occurs within these diffusers where some combustion occurs and the nearly uniform mixture then enters the combustion chamber where it burns completely within a short axial distance from the diffusers. It will be understood that the change of shape of the diffusers from circular to square or rectangular creates secondary vortices at least in the outer portions of the vortices established by the vortex generators further improving the mixing of the several fluids entering the diffusers.

In the combustion process, the pilot fuel mixes with the engine gas and burns downstream of the flameholder thereby increasing the temperature of the gas in this passage 8. When the main augmenter fuel is injected it is not immediately ignited since it burns only when vaporized. It has been found that in the time required for vaporization of this fuel and in the ignition delay time, the fuel injected by the nozzles 24 is carried downstream and enters the holes 50 so that combustion of the main augmenter fuel occurs in and downstream of the diffusers. Because of the complete vaporization of the fuel and the intimate mixing of this fuel-rich mixture with the air or gas in the vortices in the diffusers, there is complete combustion of the fuel in a very short distance axially of the burner. This has two favorable results. First, the through mixing of the air or engine gas with the vaporized fuel entering the holes 50 assures such complete burning as to minimize such pollutants as carbon monoxide and the nitrogen oxides. With clean burning and the minimizing of pollutants the engine is able to meet the established requirements for a minimum of these pollutants.

Although the vortices created by the generators may all be the same direction it is desirable to have rotation of adjacent vortices in opposite directions as this will further enhance the mixing of the fluids in and just downstream of the diffusers. By sealing the edges of adjacent diffusers so that no axial flow of gas occurs between adjacent diffusers, the mixing action of the secondary vortices is not affected detrimentally. As shown, the intermediate duct and shield terminate at the vortex generators, preferably near the upstream ends of the outer shrouds to permit a flow of the pilot gas and fuel to flow around these shrouds and around the diffusers so as to enter freely into the holes in the diffusers.

For best results, it is desirable to adjust the sizes of the openings in the diffusers 34 and 36 so as to assure the best combustible mixture in these diffusers. For example, the holes 50 in diffusers 36 would normally be much smaller than in the diffusers 34 because the engine gas carries less oxygen and cannot therefore provide complete combustion of the same quantity of fuel-rich gas as can the fan air in the diffusers 34. By selectively balancing the sizes of these holes, the proper quantity of fuel-rich gas will be supplied to each diffuser for best combustion results. In any event, the mixing is complete enough by this construction to assure complete combustion in a very short combustion chamber with a minimum amount of pollutants discharging from the propulsion nozzle.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. An augmenter for use in a ducted fan gas turbine including:
   an outer duct surrounding the augmenter;
   an intermediate duct within and spaced from the outer duct and defining therebetween a passage for fan air;
   an inner duct within and spaced from the intermediate duct and defining therebetween a passage for engine exhaust gas;
   a shield between the intermediate and inner ducts and spaced from the intermediate duct to define adjacent the intermediate duct a passage for combustion gas, the upper end of this passage being open to the engine gas passage;
   vortex generators mounted on the intermediate duct and positioned in the fan air passage, said generators being spaced from each other circumferentially of the fan air passage and spaced from the outer duct;
   other vortex generators positioned in the engine gas passage between the shield and the inner wall and spaced from the inner wall and from each other circumferentially of the augmenter;
   said generators including inner and outer shroud rings with turning vanes extending between the rings;
   and diffusers secured to the outer shroud rings of said generators and extending downstream therefrom, said diffusers becoming substantially rectangular at their downstream ends and being in close relation to one another and to the inner and outer walls at their downstream ends;
   large holes in the diffusers near the upstream ends for the admission of pilot gas and fuel from the pilot passage into said diffusers.

2. An augmenter as in claim 1 in which the intermediate duct and shield terminate adjacent to the vortex generators to allow combustion gas and fuel to flow around the diffusers for entry through the holes therein.

3. An augmenter as in claim 1 including sealing means between adjacent diffusers at their downstream end to cause substantially all of the combustor gas and fuel to enter the diffusers through the holes therein.

4. An augmenter as in claim 3 in which other sealing means between the diffusers and the adjacent inner and outer walls further limit flow of gas past these diffusers.

5. An augmenter as in claim 1 including augmenter fuel nozzles for delivering fuel to said combustion gas passage downstream of the flameholder.

6. An augmenter as in claim 5 including pilot fuel nozzles in the intermediate wall upstream of the augmenter fuel nozzles delivering fuel into the pilot gas passage and a flameholder in said passage downstream of the nozzles.

7. An augmenter as in claim 6 including an igniter in said pilot gas passage for igniting the fuel from said pilot nozzles.

8. An augmenter as in claim 1 including inner and outer divergent rings in the inner and outer ducts adjacent the diffusers and spaced therefrom, the inner and outer ducts being more widely spaced downstream of these rings.

9. An augmenter as in claim 5 including means upstream of said augmenter nozzles for adding heat to the combustion gas before the augmenter fuel is injected therein.

* * * * *